United States Patent
Yabuki et al.

(10) Patent No.: US 6,460,354 B2
(45) Date of Patent: Oct. 8, 2002

(54) METHOD AND APPARATUS FOR DETECTING LOW REFRIGERANT CHARGE

(75) Inventors: Roy M. Yabuki, Arlington, TX (US); Derek Y. Kamemoto, Seattle, WA (US); Virender Jain, Lake Forest; Richard L. Kenyon, Irvine, both of CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/798,315

(22) Filed: Mar. 2, 2001

(65) Prior Publication Data

US 2002/0121100 A1 Sep. 5, 2002

Related U.S. Application Data

(60) Provisional application No. 60/250,215, filed on Nov. 30, 2000.

(51) Int. Cl.[7] ................................................. F25B 49/02
(52) U.S. Cl. ............................ 62/129; 62/131; 62/225
(58) Field of Search .......................... 62/125, 126, 127, 62/129, 131, 157, 158, 231, 222, 224, 225, 212, 210, 203, 204, 209, 208

(56) References Cited

U.S. PATENT DOCUMENTS

| | | | |
|---|---|---|---|
| 2,195,220 A | 3/1940 | McGrath | |
| 2,534,455 A | 12/1950 | Koontz | |
| 3,478,534 A | 11/1969 | Matthies | |
| 3,744,267 A | 7/1973 | Norbeck | |
| 4,167,858 A | 9/1979 | Kojima et al. | ............. 62/129 X |
| 4,467,183 A | 8/1984 | Ishima | |
| 4,484,822 A | 11/1984 | Hancock | |
| 4,506,518 A | 3/1985 | Yoshikawa et al. | |
| 4,571,951 A | 2/1986 | Szymaszek | |
| 4,617,804 A | 10/1986 | Fukushima et al. | ....... 62/212 X |
| 4,638,147 A | 1/1987 | Dytch et al. | |
| 4,646,535 A | 3/1987 | Matsuoka et al. | |
| 4,653,288 A | 3/1987 | Sayo et al. | ................ 62/225 X |
| 4,677,830 A | 7/1987 | Sumikawa et al. | ........... 62/126 |

(List continued on next page.)

FOREIGN PATENT DOCUMENTS

| | | |
|---|---|---|
| DE | 38 32 226 C2 | 10/1991 |
| DE | 40 08 877 A1 | 10/1991 |
| EP | 0 344 444 | 12/1989 |
| EP | 0 443 099 A3 | 8/1991 |

OTHER PUBLICATIONS

SAE Technical Paper Series 942281 authored by Gary P. Hansen of Red Dot Corporation and Virender Jain of Parker–Hannifin Corporation dated Nov. 7, 1994, entitled The Development of a complete Refrigerant Management System for Heavy Duty Vehicle Air Conditioning Applications.

(List continued on next page.)

Primary Examiner—Harry B. Tanner
(74) Attorney, Agent, or Firm—Christopher H. Hunter

(57) ABSTRACT

Apparatus for detecting low charge of a working fluid in a heat transfer system of the type having a fluid circuit comprising a compressor for pressurizing working fluid received from an evaporator, a condenser and condenser fan for cooling the working fluid received from the compressor, and an expansion device for controlling flow of the working fluid between the condenser and the evaporator, the apparatus comprising: a working fluid state sensor operative in response to a control signal and disposed in the fluid circuit on the outlet side of the evaporator to produce a working fluid state signal; and a control circuit for providing the control signal to the sensor and for controlling operation of the heat transfer system based on a comparison of the working fluid state signal with a state set point; the control circuit detecting a low charge condition of the working fluid when the state signal indicates the working fluid superheat exceeds a first predetermined threshold over a first predetermined time with the expansion device in a fully open condition.

25 Claims, 9 Drawing Sheets

U.S. PATENT DOCUMENTS

| | | | |
|---|---|---|---|
| 4,790,145 | A | 12/1988 | Thompson et al. |
| 4,794,762 | A | 1/1989 | Orth et al. |
| 4,807,445 | A | 2/1989 | Matsuoka et al. |
| 4,835,976 | A | 6/1989 | Torrence |
| 4,841,734 | A | 6/1989 | Torrence |
| 4,848,100 | A | 7/1989 | Barthel et al. |
| 4,898,476 | A | 2/1990 | Herrmann et al. |
| 4,944,160 | A | 7/1990 | Malone et al. |
| 4,993,231 | A | 2/1991 | Torrence et al. |
| 5,000,589 | A | 3/1991 | Kumada et al. |
| 5,035,119 | A | 7/1991 | Alsenz |
| 5,086,624 | A | 2/1992 | Matsuoka et al. |
| 5,144,814 | A | 9/1992 | Gaudette |
| 5,150,584 | A | 9/1992 | Tomasov et al. ......... 62/126 X |
| 5,186,014 | A | 2/1993 | Runk .......................... 62/129 |
| 5,201,862 | A * | 4/1993 | Pettit ........................... 62/157 |
| 5,209,076 | A | 5/1993 | Kauffman et al. ............ 62/126 |
| 5,243,829 | A * | 9/1993 | Bessler .................... 62/129 X |
| 5,252,939 | A | 10/1993 | Riefler et al. |
| 5,289,692 | A | 3/1994 | Campbell et al. |
| 5,295,656 | A | 3/1994 | Campbell et al. |
| 5,301,514 | A | 4/1994 | Bessler |
| 5,335,513 | A | 8/1994 | Campbell et al. |
| 5,449,884 | A | 9/1995 | Lee |
| 5,460,349 | A | 10/1995 | Campbell et al. |

OTHER PUBLICATIONS

Paper No. 2000–01–0976 by James Solberg, Norman R. Miller and Predrag Hrnjak, entitled "A Sensor for Estimating the Liquid Mass Fraction of the Refrigerant Exiting and Evaporator" © 2000 Society of Automotive Engineers, Inc. Applicants request the Examiner to consider this reference as prior art under 102(a), however, Applicants respectfuuly reserve the right to supplement this Information Disclosure Statement and take a contrary position should it be necessary.

Industry Vehicle Technology '95 article entitled "AC Management for Heavy–Duty Vehicles" authored by Gary P. Hansen of Red Dot Corporation. It is believed this Article was published in 1995.

* cited by examiner

US 6,460,354 B2

METHOD AND APPARATUS FOR DETECTING LOW REFRIGERANT CHARGE

CROSS-REFERENCE TO RELATED CASES

The present application claims priority to U.S. Provisional Application Serial No. 60/250,215; filed Nov. 30, 2000, which is incorporated herein by reference.

BACKGROUND OF THE INVENTION

This application is related to U.S. Pat. Nos. 5,289,692, 5,477,701, 5,522,231 and 5,877,486, the entire disclosures of which are fully incorporated herein by reference. The above patents are referred to herein collectively as the Low Side patents.

The invention relates generally to heat transfer and refrigeration control systems. More particularly, the invention relates to apparatus and methods for detecting low charge and very low charge conditions of the working fluid in such systems.

The basic building blocks of all refrigeration and heat transfer systems are well known and include a compressor, a condenser, an expansion means and an evaporator, all of which are connected in a fluid circuit having a working fluid such as halogen containing working fluids such as chlorofluorocarbons (CFCs), hydrochlorofluorocarbons (HCFCs), and hydrofluorocarbons (HFCs), and so forth. In an automotive or truck air conditioning system, for example, the working fluid or refrigerant is typically in heat exchange with the vehicle compartment ambient air by means of the evaporator. The liquid refrigerant turns to gas as it passes through the evaporator or endothermic heat exchanger thus absorbing heat from the ambient air. The working fluid leaving the evaporator, preferably is in an all gaseous state, and is drawn into the compressor through a suction line. The compressor increases the gas pressure and the gas then passes through the condenser or exothermic heat exchanger where it is cooled back to a liquid state but is still under high pressure. The liquid high pressure working fluid is then passed through the expansion means, such as an expansion valve, wherein the fluid pressure is adiabatically decreased prior to re-entering the evaporator.

In such systems and others, it is important to detect quickly a low charge or very low charge condition. If the working fluid is being lost, the system will not operate properly and system components such as the compressor can be damaged by operation without adequate lubrication.

Accordingly, the objectives exist for economical, reliable and accurate apparatus and methods for detecting low charge and very low charge conditions of a working fluid in a heat transfer system.

SUMMARY OF THE INVENTION

The present invention contemplates apparatus and methods for detecting low charge and very low charge conditions of a working fluid for a heat transfer system. In one embodiment of the invention, such apparatus for detecting low charge of a working fluid in a heat transfer system of the type having a fluid circuit comprising a compressor for pressurizing working fluid received from an evaporator, a condenser and condenser fan for cooling the working fluid received from the compressor, and an expansion device for controlling flow of the working fluid between the condenser and the evaporator, the apparatus comprising: a working fluid state sensor operative in response to a control signal and disposed in the fluid circuit on the outlet side of the evaporator to produce a working fluid state signal; and control means for providing said control signal to the sensor and for controlling operation of the heat transfer system based on a comparison of said working fluid state signal with a predetermined state set point; said control means detecting a low charge condition of the working fluid when the state signal indicates the working fluid superheat exceeds a first predetermined threshold over a predetermined time with the expansion device in a fully open condition.

The invention further contemplates the methods associated with the use of such apparatus, as well as in another embodiment, a method for detecting low charge condition of a working fluid in a heat transfer system of the type having a fluid circuit comprising a compressor for pressurizing a working fluid received from an evaporator, a condenser and condenser fan for cooling the working fluid received from the compressor, and an expansion device for controlling flow of the working fluid between the condenser and the evaporator, the method comprising the steps of:

a) detecting superheat state of the working fluid on the outlet side of the evaporator over a first predetermined time whenever the expansion device is fully open; and b) detecting low charge condition of the working fluid when the working fluid superheat exceeds a first predetermined threshold over the first predetermined time with the expansion device in a fully open condition.

These and other aspects and advantages of the present invention will be readily understood and appreciated by those skilled in the art from the following detailed description of the preferred embodiments with the best mode contemplated for practicing the invention in view of the accompanying drawings.

DETAILED DESCRIPTION OF THE INVENTION

Figure 1:
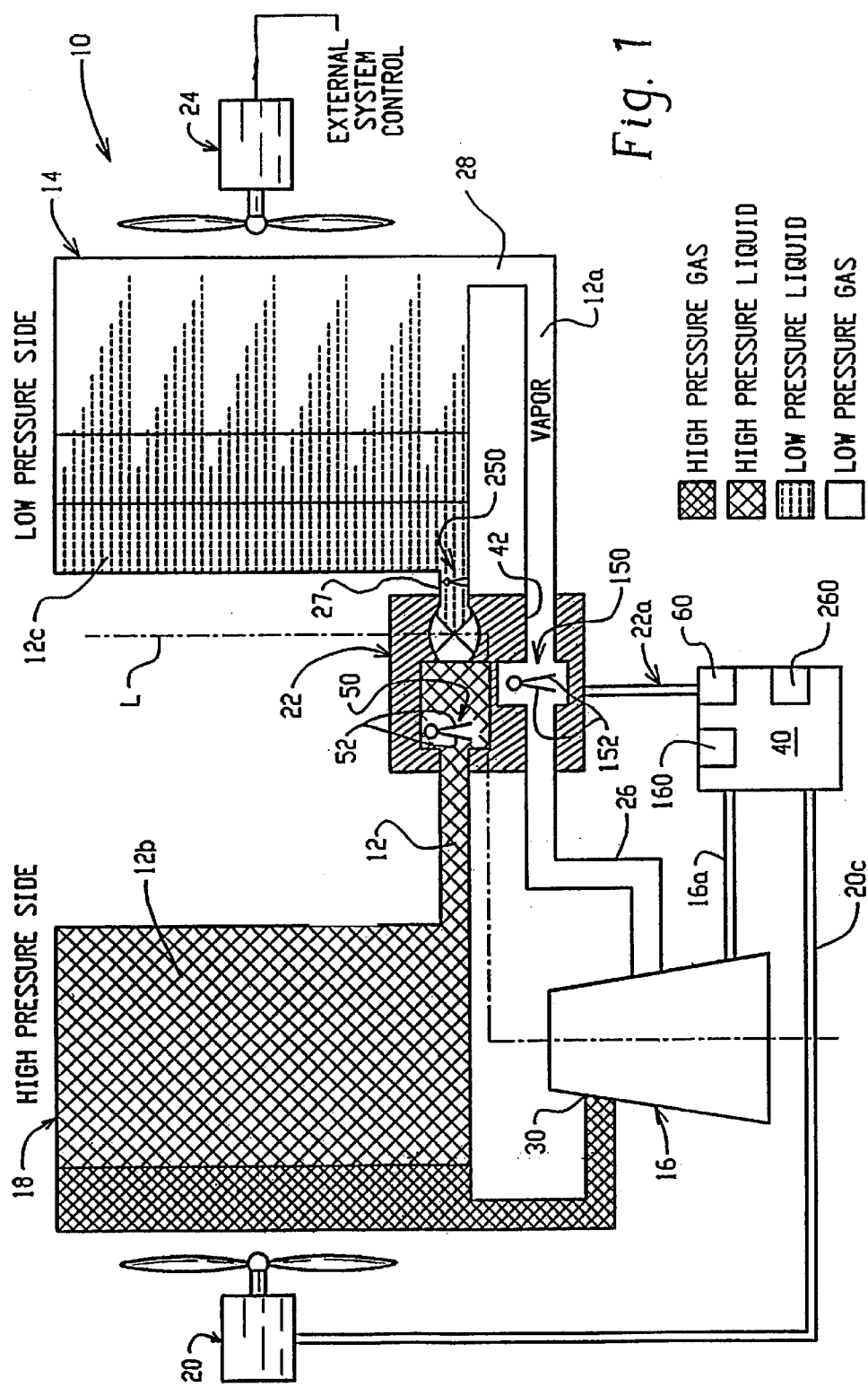
FIG. 1 is a simplified schematic diagram of a heat transfer system suitable for use with the present invention including sensors according to the invention incorporated therein.

With reference to FIG. 1, a heat transfer system is generally designated by the numeral 10. For convenience, the invention is described herein in connection with a vehicle air conditioning system such as may be used for cars and trucks. However, this exemplary description is only for convenience, ease of explanation and clarity and should not be construed in a limiting sense. For this reason, the heat transfer system components are described in basically generic terms without specific detail because they form no particular part of the invention except as specifically noted herein. The invention is suitable for use with any type of heat transfer system including, but not limited to, commercial refrigeration, heat pump systems, residential air conditioning, industrial air conditioning and so forth. The invention is particularly useful for vehicle air conditioning because of its small size, low power consumption and fast response to system conditions. Furthermore, the invention is not limited to use with specific working fluids, but can be used to determine characteristics of any working fluid compatible with the temperature dependent resistance devices. Of particular interest for future refrigeration management systems is that the invention is suited for use with R-134A working fluid.

As used herein, the terms "refrigerant" and "working fluid" are used interchangeably and in their broadest sense to include any fluid used to effect exothermic and endothermic heat transfer. Furthermore, the terms "heat transfer" and "refrigeration" are not intended to be limiting in any sense, so that it will be understood that the invention can be used with cooling systems, heating systems and systems that interchangeably heat and cool.

In general then, the heat transfer system 10 includes a working fluid 12, such as, for example, R-12 or R-134A in an interconnected fluid circuit that includes an evaporator 14, a compressor or pump 16, a condenser 18 including a condenser fan 20 and an expansion device 22. The evaporator 14 typically is positioned proximate a fan 24 that blows ambient air, such as passenger compartment air, over cooling fins on the evaporator so that the working fluid 12 absorbs heat from the ambient air. In FIG. 1 the working fluid 12 is shaded in different ways to illustrate in an exemplary manner the different phases and pressure conditions typical in a heat transfer system 10. The dashed line "L" illustrated in FIG. 1 generally notes the pressure line— working fluid in the components to the left of the line L is generally under high pressure, and working fluid in components to the right of the line L is generally under low pressure.

The compressor 16 draws gaseous working fluid 12a through a suction line 26 from the evaporator outlet 28. The compressor 16 raises the pressure of the gaseous working fluid 12, typically to an operating pressure of several hundred PSIA. From the compressor outlet 30, the working fluid 12 flows to the condenser 18 wherein it is cooled to a liquid state 12b. Cooling of the fluid 12 can be regulated by operation of a condenser fan 20.

The expansion device 22 is preferably an expansion valve that is used to regulate the flow of high pressure liquid working fluid 12b to the evaporator inlet 27 while dropping the pressure of the working fluid to the operating pressure of the evaporator 14. As the low pressure liquid working fluid 12c passes through the evaporator 14, it absorbs heat from the ambient air and vaporizes or boils off. In a typical heat transfer system, it is often desirable that only vaporous working fluid flow into the compressor 16 from the evaporator 14. Thus, the working fluid will typically be in or nearly in a completely vapor state by the time it exits the evaporator 14. However, for heat transfer systems that operate in dynamic environments where the ambient load can change significantly, as well as other dynamic conditions, the heat transfer system may start to operate in a "wet" state or with a higher wetness than under normal steady state conditions. This is particularly so for systems that are designed to operate at low superheat conditions wherein some degree of wetness is expected.

An electronic controller circuit 40 may be used to control operation of the condenser fan 20 using signal lines 20a, to activate and deactivate the compressor 16 motor and/or clutch (not shown) using signal lines 16a, and to control operation of the expansion valve 22 using signal lines 22a. Typically, the controller 40 increases flow of working fluid 12 through the valve 22 as the thermal load increases, and decreases the flow when the thermal load decreases. Also, as the pressure increases on the inlet side of the valve 22 the controller 40 may either turn the compressor 16 clutch off, or actuate the condenser fan 20 on, or combinations of all the above.

These and other various control functions can be programmed into the controller 40 in a known manner to maintain the operating parameters or state setpoints of the working fluid within predetermined limits. An important aspect for various control algorithms is to monitor or detect the working fluid 12 pressure on the high pressure side of the system 10, such as between the condenser outlet and the valve 22 inlet. The present embodiment uses a preferred high pressure sensor and method embodied in the form of a self-heated thermistor that exhibits a heat transfer or conductance transition that can be correlated to saturation pressure characteristics of the working fluid 12. Such a high pressure sensor and method is fully described in U.S. Pat. No. 5,335,513 entitled "APPARATUS AND METHOD FOR DETECTING CHARACTERISTICS OF A WORKING FLUID"; and U.S. Pat. No. 5,660,052 entitled "APPARATUS AND METHOD FOR DETECTING CHARACTERISTICS OF A WORKING FLUID"; both of which are commonly owned by the assignee of the present invention, the entire disclosures of which are fully incorporated herein by reference. These disclosures are referred to collectively herein as the High Side sensor disclosure. Other pressure sensors, however, can be used with the present invention.

As described in the above referenced High Side disclosure, and in a preferred embodiment thereof, a high pressure side working fluid sensor for a heat transfer system includes a temperature dependent electrical resistance element 50 that preferably is disposed in direct thermal contact with the working fluid. In this configuration, the resistance element 50 is used to locally heat the working fluid. For the exemplary system described herein, the resistance element 50 is positioned in the fluid circuit near the high pressure inlet port of the expansion valve 22. However, this particular location is exemplary only, and those skilled in the art will readily appreciate that the resistance element 50 can be positioned at locations in the fluid circuit where it is desired to detect characteristics of the working fluid.

The resistance element 50 is preferably realized in the form of a thermistor, such as part no. E15SA1B053 available from Victory Engineering. A thermistor is used because it can easily be monitored by the electronic controller 40, and also because it can be used conveniently to heat locally the working fluid by passing current therethrough and as a fluid temperature sensor. However, the invention is not limited to the use of a thermistor as the resistance element 50, and other devices such as resistance temperature devices (RTDs), or a temperature sensor in combination with a separate heating element, could be used, just to name a few.

The thermistor 50 includes two electrical leads 52 that are connected to a control circuit 60 that preferably is included as part of the system controller 40. The detailed design for a suitable control circuit 60 for the high side pressure sensor is fully described in the above-referenced patent. The thermistor leads 52 can be connected to the control circuit 60 via the multiwire cable 22a which, as described above, also includes electrical leads for connecting the expansion valve to the system controller 40.

The control circuit 60 produces an output control signal on one of the signal lines 22a at appropriate times and intervals. The control signal has two discrete states, high and low. During each time period when the control signal is high, the current through the thermistor 50 is a very low level current. This low current time period can thus be used to sense the temperature of the working fluid 12 because the thermistor 50 does not appreciably self-heat. During each time period when the control signal is low, a generally linear time varying current through the thermistor 50 is produced. This current control signal causes the thermistor 50 to gradually self-heat which in turn causes localized heating of the working fluid 12. In a typical system, the low level sensing current may be on the order of 8 to 20 milliamps and the self-heating current may be ramped up to, for example, 300 milliamps. The high and low current time periods may be selected to be of any convenient duration. A range of about 0.69 to 2 seconds for the temperature sensing period has been found suitable, while a time period from about 1.9 to 8 seconds for the current ramp time has been found suitable. These time periods are exemplary and not critical, however, and the system 40 can be programmed to vary these times as required for a specific application.

As described in the High Side sensor disclosure, the control circuit 60 is programmed to determine a local minimum thermal resistance or conductance as between the thermistor 50 and the working fluid 12. This local minimum thermal conductance/resistance is detectable as the thermistor 50 is gradually self-heated, because when the working fluid 12 reaches saturation temperature (locally in the volume around the thermistor 50) there is a detectable change in the thermal conductance or heat transfer efficiency from the thermistor 50 to the surrounding fluid. The thermistor 50 is operated in the low current and high current modes as part of the data acquisition for determining the thermal conductance/resistance characteristic. In this manner, the thermistor 50 can be used to detect a characteristic of the working fluid 12, on the high pressure side of the valve 22, that closely correlates with the saturation temperature thereof, and hence serves as an accurate pressure sensor. For purposes of the instant invention, the value "HSSATT" refers to the determination of the working fluid high pressure side saturation temperature related characteristic determined by the control circuit 60 using the high side thermistor 50.

The expansion valve 22 is preferably realized in the form of a linear proportional solenoid actuated valve, controlled electrically by a solenoid current supplied by the system controller 40. Such a valve is fully described in U.S. Pat. No. 5,252,939 entitled "Low Friction Solenoid Actuator and Valve"; U.S. Pat. No. 5,460,349 entitled "Expansion Valve For Air Conditioning System With Proportional Solenoid"; and U.S. Pat. No. 5,295,656 entitled "Expansion Valve Control Element for Air Conditioning System"; all of which are commonly owned by the assignee of the present invention, the entire disclosures of which are fully incorporated herein by reference.

In accordance with the present invention, a low side sensor 150 is provided that is used to detect characteristics of the working fluid 12 on the outlet side of the evaporator 14. The low side sensor 150 can be used to detect quality of the working fluid 12, and this mode of operation is fully described in the above referenced disclosures. The sensor 150 can also be used, as set forth in detail hereinafter, to detect superheat characteristics of the working fluid 12, particularly under operating conditions of the system 10 which cause the working fluid 12 to be in a higher superheat condition, for example, greater than 5° F. superheat. Such conditions may arise from, for example, a significant change in the load for the heat transfer system, or a commanded higher superheat condition such as during a mass flow reduction mode (as described in the above disclosures). The controller 40 can then use the detected low side working fluid state (and other detected characteristics such as temperature) and adjust mass flow via the valve 22, pressure via the compressor, condenser cooling and so on through the evaporator 14 to maintain the working fluid state at a selected setpoint stored in the controller 40 memory.

In a preferred embodiment, the low side sensor 150 is realized in the form of a temperature dependent resistance element that preferably is disposed in direct thermal contact with the working fluid 12 on the outlet side of the evaporator 14. For the exemplary system described herein, the sensor 150 is positioned in the fluid circuit in a through port 42 formed in the valve 22 body which forms part of the suction line connection from the evaporator 14 to the compressor 16. However, this particular location in the fluid circuit is exemplary only, and those skilled in the art will readily appreciate that the sensor 150 can be positioned at any location where characteristics of the working fluid 12 are to be detected. Typically this will be in the suction line 26 at or between the evaporator 14 outlet and the compressor 16 inlet.

The sensor 150 is preferably realized in the form of a thermistor, such as part no. E15SA1B053 available from Victory Engineering. A thermistor is preferably used because it is low in cost, can be monitored easily by the electronic controller 40, and also because it can conveniently be used in a self-heated and non self-heated mode by controlling the current therethrough.

The thermistor sensor 150 includes electrical leads 152 that are connected to a control circuit 160 that preferably is included as part of the system controller 40. The thermistor leads 152 can be connected to the control circuit 160 via the multiwire cable 22a. However, the control circuit 160 for operating the sensor 150 does not have to be part of the overall system controller but can be separately provided as a stand alone circuit or separate circuit module connected to the system controller.

Figure 2:
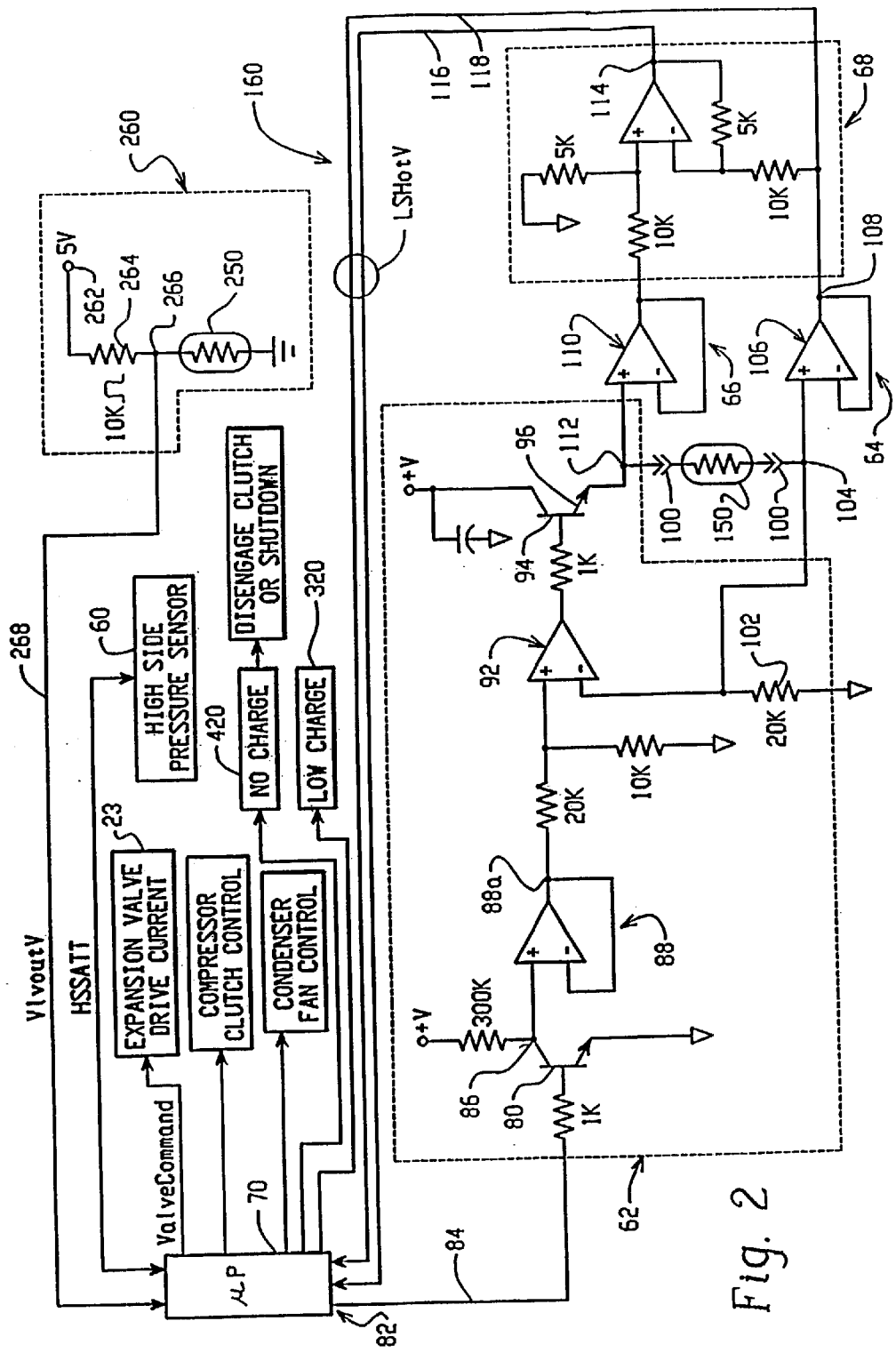
FIG. 2 is a circuit schematic of a preferred control circuit for use with the invention.

With reference now to FIG. 2, there is illustrated therein a preferred control circuit 160 used in combination with the thermistor 150 to realize a quality and superheat sensor in accordance with the teachings of the present invention. This circuit is, from a hardware and connection standpoint, substantially identical to the low side sensor control circuit described in the above referenced U.S. Pat. No. 5,477,701 patent, and reference may be made thereto for the description of operation. In short, the circuit 160 is used to apply a fixed current level, for example, 80 milliamps to the thermistor 150 to cause the thermistor to self-heat. The circuit 160 also includes two signal lines 116 and 118 that are input to a microprocessor 70 that uses the signals to calculate the resistance of the thermistor 150. The circuit 160 can also be used to apply a low non self-heating current level to the thermistor 150 if needed for a particular application.

In the present invention, it is contemplated that the low side sensor 150 will typically be operated in a continuous self-heated mode, although other modes are available as needed. The output of the low side sensor 150 in the self-heated mode as determined by the microprocessor 70 is referred to hereinafter as LSHotV (for Low Side hot voltage—i.e. the sensor 150 voltage value in a self-heat mode) and corresponds to the resistance of the thermistor 150 and thus the detected temperature of the working fluid 12 in contact with the thermistor 150 on the outlet side of the evaporator 14. The detected temperature is actually the sum of the temperature due to self-heating plus the working fluid temperature.

In the self-heated mode, the low side sensor 150 can detect working fluid quality because the liquid droplets dramatically alter the sensor's heat transfer characteristics and thus resistance value, as fully described in the above referenced disclosures. For a conventional self-heated thermistor quality sensor 150 that produces an output based on fluid temperature, wetness and superheat are observed to be inversely proportional. That is, as mass flow through the evaporator 14 increases, wetness (i.e. droplet size and number) increases and superheat decreases. This is illustrated in a representative manner in FIG. 3, which illustrates quality/superheat detection using a self-heated thermistor without compensation for load variations. Conversely, at low superheat states, as mass flow of the working fluid 12 through the evaporator decreases, wetness decreases and superheat increases.

However, above about 5° F. superheat, mass flow can increase significantly with little detectable change in wetness, thus rendering quality detection using thermal conductance less effective for controlling mass flow through the evaporator 14 at higher superheats. In other words, a quality sensor that is used for detecting thermal conductance between the thermistor and the working fluid produces a superheat/wetness curve with a very small or undetectable slope in the superheat region [e.g. the curves in FIG. 3 would be generally flat above 5° F. superheat].

Figure 3:
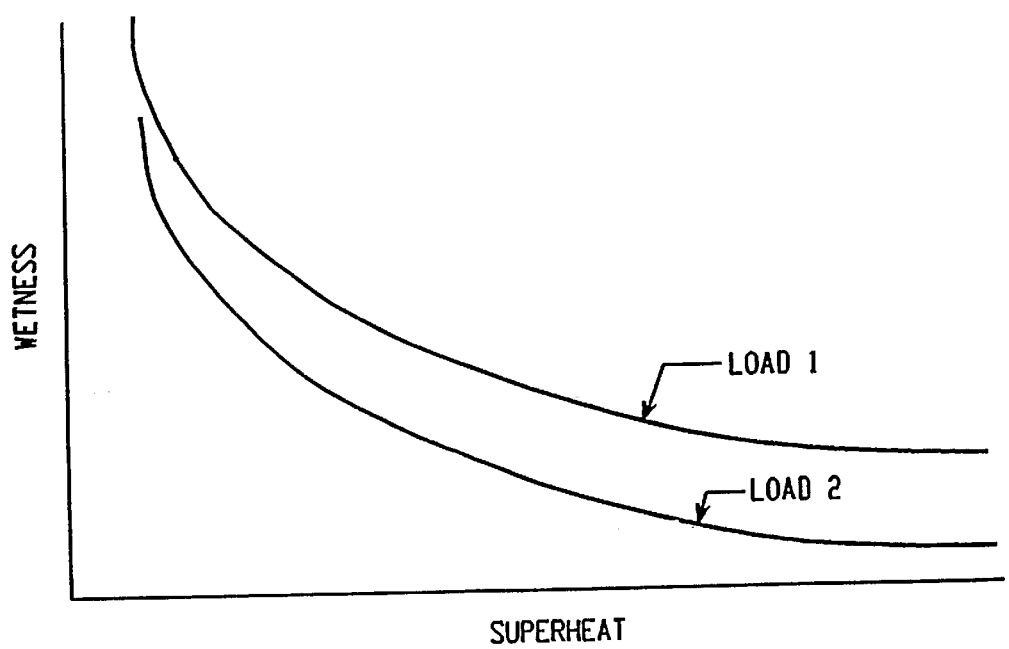
FIG. 3 is a graph representing a relationship between wetness and superheat at the outlet side of a typical evaporator used with a heat transfer system such as shown in FIG. 1 as detected with a self-heated thermistor.

Although a conventional self-heated low side sensor based on temperature detection (in contrast to thermal conductance detection) can be effectively used for superheat measurement, such a sensor is not particularly effective in the quality region when droplets are present. Additionally, conventional superheat control accuracy is typically dependent on a low and relatively stable pressure drop across the evaporator. Still further, and as shown in FIG. 3, it has been observed that a self-heated thermistor used to detect superheat produces readings that are dependent on the thermal load at the evaporator, as will be further discussed hereinafter.

In this embodiment of the present invention, a third sensor 250 is used. This sensor 250 is disposed in the working fluid 12 on the low pressure side of the expansion valve 22, such as, for example, at the inlet 27 to the evaporator 14. The third sensor 250 is preferably realized in the form of a thermistor, and conveniently can be the same type thermistor as used for the low side sensor 150. Another thermistor that is suitable is part no. E41SF0B044 available from Victory Engineering. The sensor 250 is electrically connected to a sensing circuit 260 by suitable leads (not shown in FIG. 1). The sensing circuit 260 can conveniently be incorporated as part of the control circuit 40 electronics.

As illustrated in FIG. 2, the sensing circuit 260 is simply a low voltage supply 262 series connected with a resistor 264 and the thermistor 250. A sense node 266 is connected via a signal line 268 to an analog input to the microprocessor controller 70. If needed, the signal at the sense node 266 can first be converted to a digital input signal using a standard analog to digital converter (not shown). With a low current supplied to the thermistor 250, voltage signals produced at the node 266 correspond to the resistance of the thermistor 250 and hence the temperature of the working fluid 12 on the inlet low pressure side of the evaporator 14. This signal is referred to hereinafter as "VlvoutV" (valve out voltage corresponding to saturation temperature of working fluid at inlet to the evaporator 14). For purposes of the instant invention it is assumed that the working fluid 12 is saturated at the inlet to the evaporator 14, and hence the third sensor 250 detects the saturation temperature of the working fluid 12.

The microprocessor 70 is programmed using conventional programming techniques. The microprocessor 70 uses the low side sensor 150 as a control element for detecting the state of the working fluid 12 on the outlet side of the evaporator 14. The microprocessor 70 then uses such information as part of its control algorithm for controlling mass flow of the working fluid 12 through the evaporator 14, as well as regulating the high side pressure, the compressor 16, the condenser fan 20 and so on. The overall system control algorithm implemented using the microprocessor controller 70 forms no particular part of the present invention, other than to the extent that the sensors 50, 150 and 250 as described herein are used as working fluid sensors. A control algorithm that uses a low side and high side sensor is described in the above noted disclosures and reference may be made thereto for further detail. The present invention is more specifically directed to the technique for improving the accuracy of the low side sensor.

In accordance with the invention then, the microprocessor 70 is programmed to determine the state of the working fluid 12 on the outlet side of the evaporator 14 using the low side sensor 150. For such operation, several assumptions are made. The first, already stated, is that the working fluid 12 at the inlet to the evaporator 14 is saturated, so that the third sensor 250 detects the saturation temperature of the working fluid 12. A second assumption is that for low superheat conditions, there are liquid droplets in the working fluid 12 on the outlet side of the evaporator 14 (i.e. the quality is less than 100%). Although this assumption seems inapposite to the strict scientific definition of "superheat", it has been observed empirically, and can best be understood in the context that a typical heat transfer system is dynamic, not a static system such as might be found in a laboratory. The thermal load on the heat transfer system often changes, and can change dramatically. Also significant is that the compressor 16 typically is driven by an engine having a constantly changing speed. Hence, the pressure of the working fluid 12 in the heat transfer system 10 is dynamic, and under superheat conditions droplets can be present at the evaporator 14 outlet. These droplets are not in thermal equilibrium with the surrounding gas because the working fluid is boiling off within the evaporator. Another assumption is that for high superheat and low pressure drop across the evaporator 14, the difference in temperature between the third sensor 250 and the low side sensor 150 is a good measure of the superheat.

As noted herein above, for low superheat states, droplets are observed in the working fluid, with wetness and superheat exhibiting a generally inverse relationship. The low side sensor 150 alone can detect such wetness in the self heated mode due to the detectable thermal transfer changes when the cooler droplets hit the thermistor 150, as described in the Low Side patents for the low side sensor 150 referred to above. Thus, the value LSHotV is a measure of wetness/superheat. The use of the low side sensor 150 in the self-heated mode without detecting thermal conductance is preferred for systems that also operate under higher superheat conditions as well as wetter conditions because, as best shown in FIG. 3, such a sensor exhibits a detectable slope in its response curve even at relatively high superheat conditions (>5° F. superheat, for example).

It has been observed, however, that the wetness/superheat relationship as detected by the self-heated thermistor 150 (LSHotV) shifts under different load conditions, and this is also illustrated in FIG. 3. Thus, even though the inverse relationship between wetness and superheat is still present, a changing thermal load on the system causes an uncompensated low side sensor 150 to operate on a different curve. If left uncorrected, this can induce errors in the control function for the heat transfer system because the controller 40 will be adjusting mass flow and other parameters based on incorrect state conditions of the working fluid at the outlet side of the evaporator 14.

Figure 5:
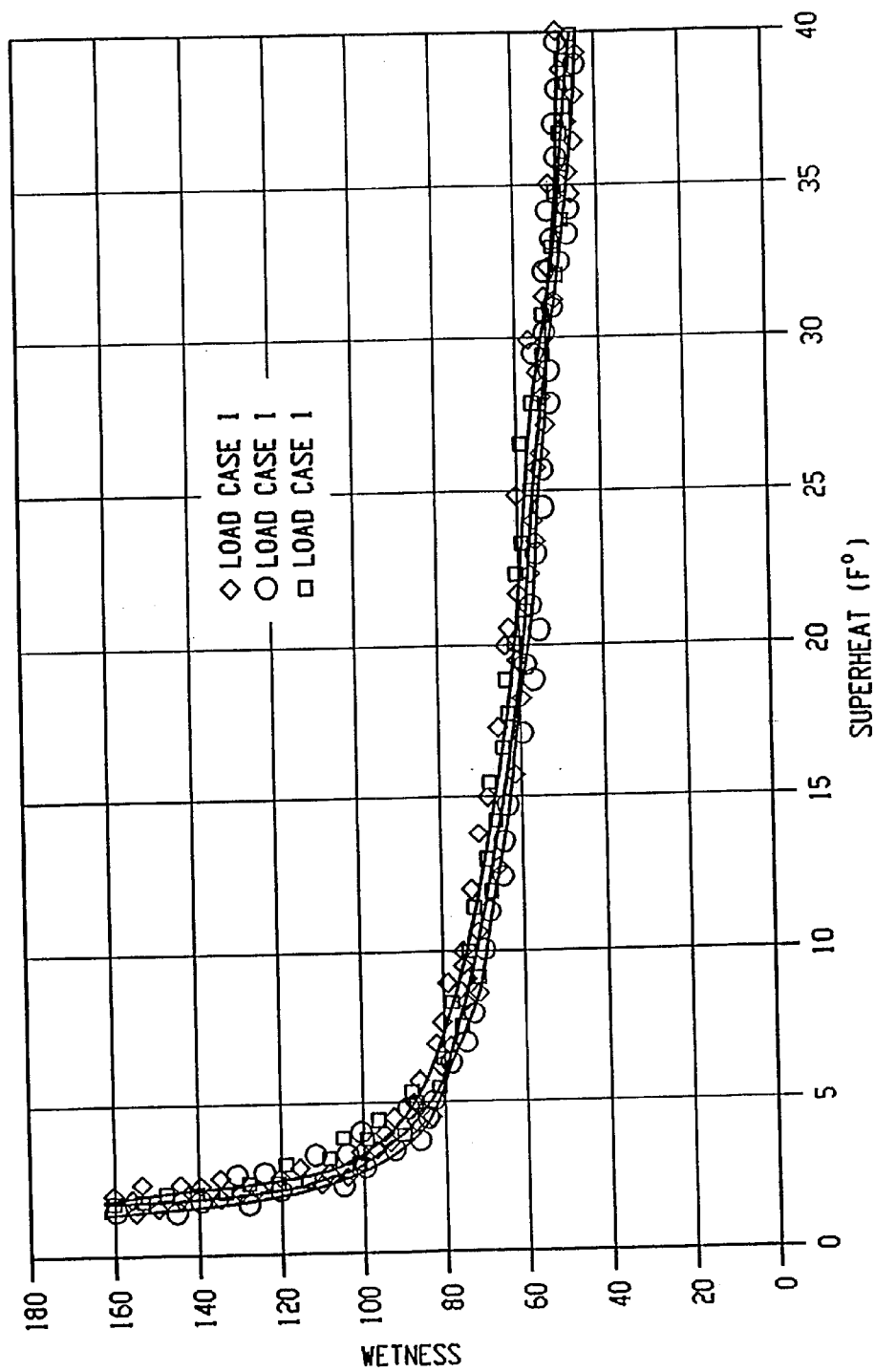
FIG. 5 is a graph representing the relationship between detected wetness/superheat for a low side sensor compensated for load variations in accordance with the invention.

In accordance with one aspect of the invention, the low side sensor 150 signal LSHotV is compensated for such load variations by programming the controller 70 to calculate the ratio of the low side sensor signal LSHotV to the third sensor signal VlvoutV, or WetSup=LSHotV/VlvoutV. This ratio compensates the low side sensor 150 signal for load variations because the saturation temperature of the working fluid 12, indicated by the third sensor 250 as value VlvoutV, also changes with load. In effect, the ratio using the VlvoutV value normalizes the low side sensor 150 data for load variations. FIG. 5 illustrates in a representative manner compensated sensor 150 readings under three load conditions. Note that, unlike the curves in FIG. 3, the curves in FIG. 5 generally lie on top of each other, meaning that the LSHotV/VlvoutV readings are predictable across different load conditions.

The ratio LSHotV/VlvoutV can be used to improve the accuracy of the low side sensor 150 detection of superheat, wetness and quality when the pressure drop across the evaporator 14 is low. However, as noted hereinabove, load variations also can cause significant pressure changes across the evaporator. Since the ratio LSHotV/VlvoutV assumes the working fluid 12 is saturated, the pressure changes under different loads should also be taken into account when required for more accurate control of mass flow of the working fluid 12.

Figure 4:
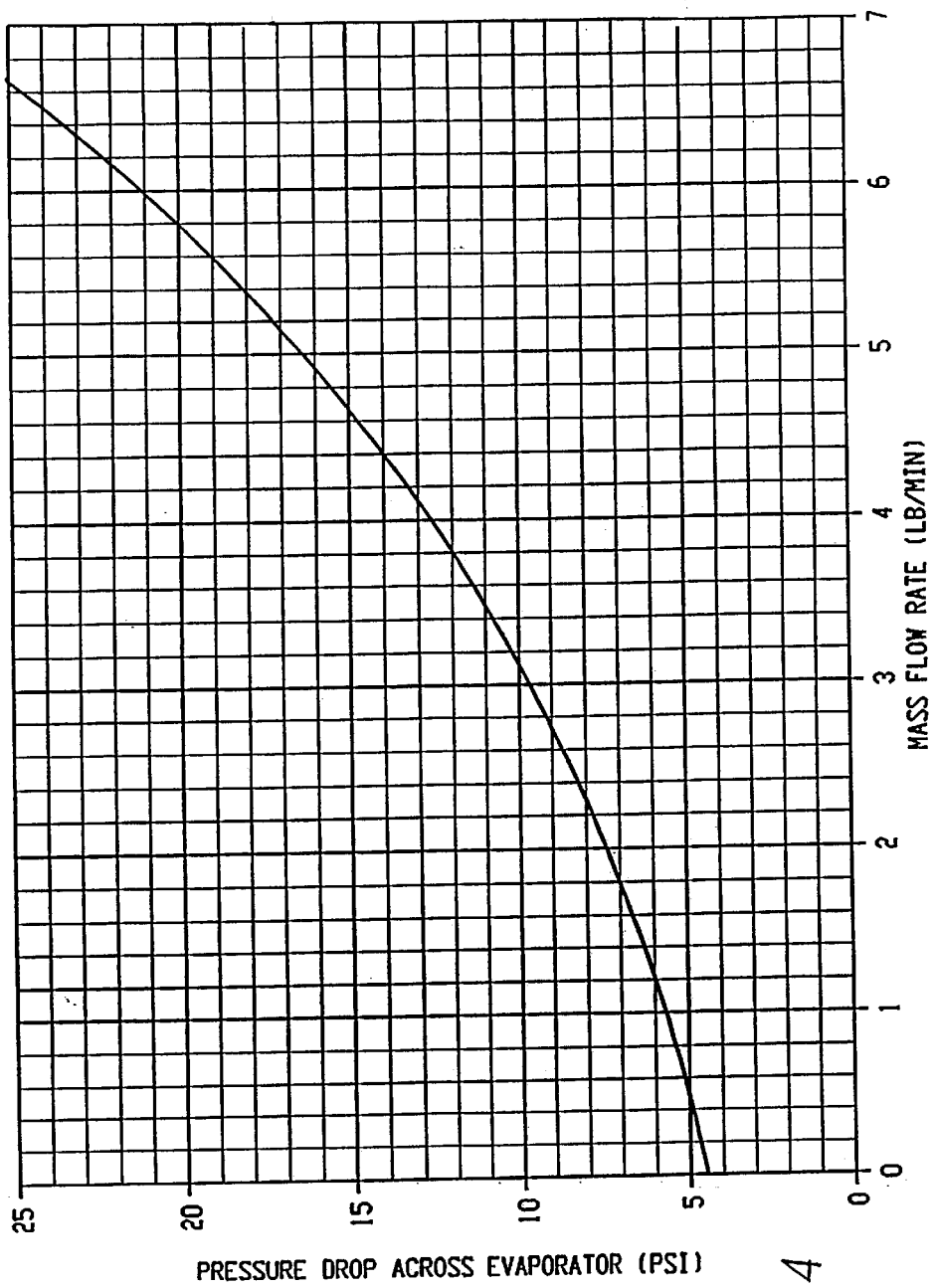
FIG. 4 is a graph representing a relationship between mass flow rate and pressure drop in a typical evaporator used with a heat transfer system such as shown in FIG. 1.

In accordance with another aspect of the present invention then, pressure changes across the evaporator 14 caused by load variations can be detected by detecting the mass flow through the expansion valve 22. FIG. 4 illustrates in a simplified way the general relationship between mass flow rate of the working fluid and pressure drop across the evaporator 14. This graph is intended to be exemplary only for purposes of illustration, it being recognized that different evaporators and heat transfer systems may exhibit different relationships. But the important point to note is that mass flow rates can be used as an indicator of pressure changes across the evaporator 14.

The thermistor sensors 50 and 250 provide a convenient way to detect the mass flow rate on a real time basis. The value HSSATT, as noted hereinbefore, corresponds to the saturation temperature which is directly related to the saturation pressure of the working fluid 12 on the high pressure side of the valve 22. The value VlvoutV is a voltage that corresponds to the saturation temperature of the working fluid 12 on the low pressure side of the valve 22, and VlvoutV thus changes as the pressure at the sensor 250 changes, since it is assumed that the working fluid 12 is saturated at the inlet to the evaporator 14. We further define VlvoutT as the corresponding temperature value of VlvoutV.

The microprocessor 70 is programmed to calculate mass flow using the sensor 150 and 50 as follows. As noted in FIG. 1, the controller 70 produces a signal that controls the drive current 23 to the expansion valve 22, and is referred to herein as "ValveCommand". This current is directly related to the valve 22 position and hence the volume of working fluid flowing through the valve 22. The difference of HSSATT and VlvoutT is related to the pressure drop across the valve 22, since both values are determined for the working fluid 12 in a saturated state. The calculated product then, ValveCommand*[HSSATT−VlvoutT]=LoadF, corresponds to the mass flow of working fluid through the valve 22. Appropriate weighing factors and scaling factors may be needed for the various values used in the calculation of ValveCommand*[HSSATT−VlvoutT], based on each specific application, valve characteristics, evaporator characteristics and so on. But the basic calculated product will provide a result that is related to the mass flow through the valve 22, simply using two thermistors 50 and 250 (the high side thermistor 50 being used in a self-heated and non self-heated mode as set forth in the above referenced high side sensor patents for detecting saturation pressure on the valve high pressure side) and the thermistor 250 being used simply as a temperature sensor in a non self-heated mode.

The value LoadF then can be used to compensate the LSHotV/ValvoutV ratio referred to herein as WetSup, or:

New WetSup=WetSup/Loadf or

WetSup=[LSHotV/ValvoutV]/[ValveCommand*{HSSATTZ−VlvoutT}]

By this calculation then, the controller 70 can accurately control mass flow, pressure and so on of the working fluid 12 through the evaporator under changing load conditions to maintain a desired state setpoint, for the working fluid in a low superheat state, higher superheat state or wetter state (quality less than 100%). The low side sensor 150 can thus be used as a quality sensor for low superheat and wetter states, and can be used as a superheat sensor for low and higher superheat states with compensation for pressure changes due to load variations.

With reference to FIGS. 6–8A,B, suitable control algorithms are shown for providing low charge and very low charge detection capability in accordance with the present invention. The system description hereinabove provides a preferred embodiment for carrying out the present invention, but those skilled in the art will readily appreciate that other heat transfer control systems could be used to realize and practice the present invention. The algorithms can be conveniently implemented in the control and operating software of the system controller 40, or other suitable control system as required.

Figure 6:
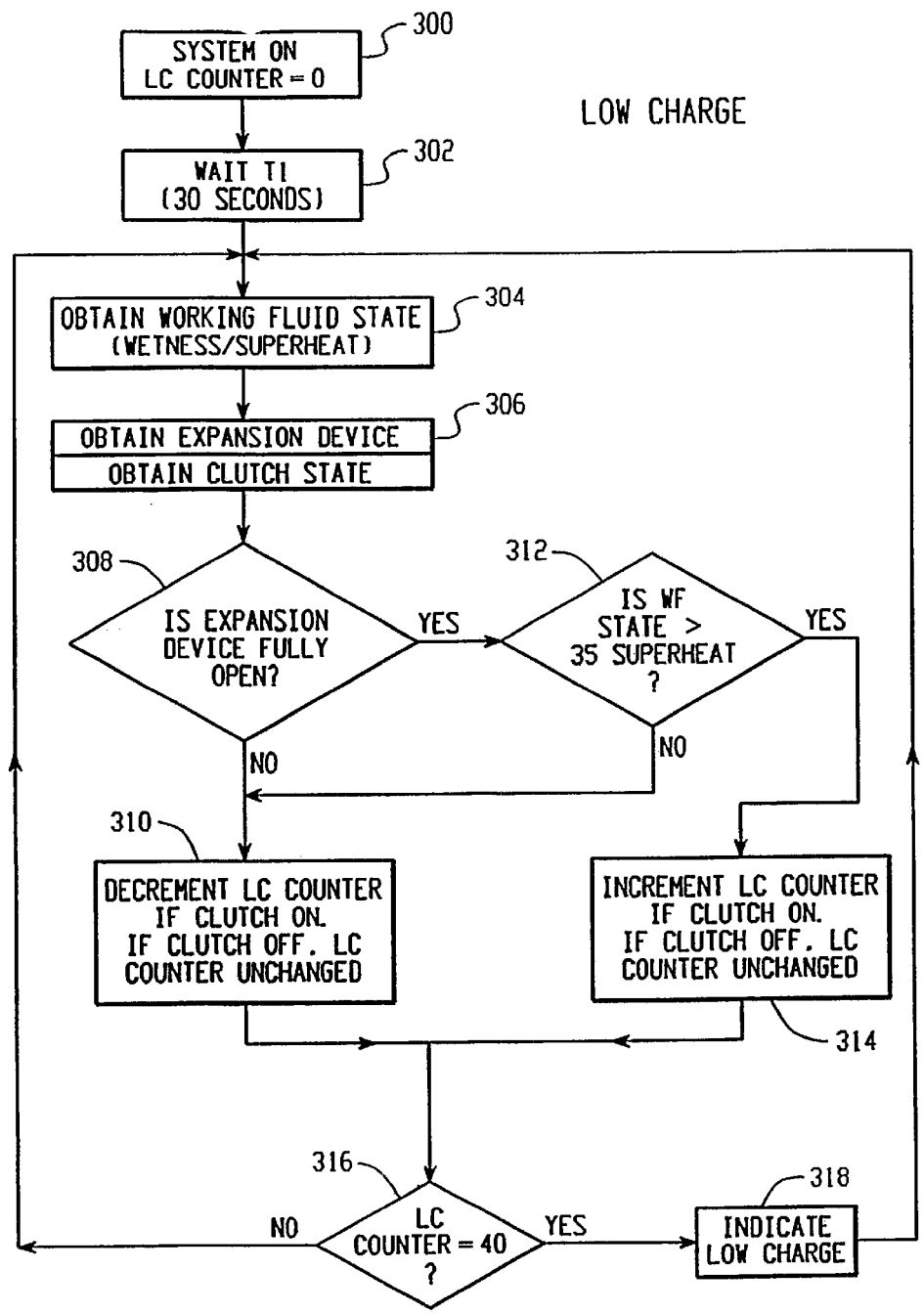
FIG. 6 is a flow diagram for a low charge detection technique in accordance with the invention.

In FIG. 6, a low charge detection operation includes at step 300 confirmation that the system 10 is on. A low charge (LC) counter is initially set to zero. The controller 40 waits at step 302 for an initial time T1, in this case, thirty seconds, for example; and then at steps 304 and 306 acquires data from the valve 22 and the sensors 50, 150 and 250. In particular, the controller 40 at step 304 determines the working fluid state at the outlet side of the evaporator 14; and at step 306 determines the position of the valve 22 based on the commanded current 23 to the valve proportional solenoid. The controller can also check at this time whether the compressor 16 clutch is engaged.

At step 308 the controller 40 determines whether the valve 22 is in the fully open condition. If the valve 22 is not fully open, the program advances to step 310, and the controller 40 decrements the LC counter by one count if the clutch is engaged. If the clutch is not engaged, the LC counter value is left unchanged.

If the valve 22 is fully open at step 308, the program advances to step 312. At step 312 the controller 40 checks whether the detected working fluid state at the evaporator 14 outlet side indicates a predetermined superheat condition, in this case, 35 degrees superheat, for example. If the answer is no, the program advances to step 310. If the superheat condition is met, the program advances to step 314 and the LC counter is incremented by one count if the clutch is engaged. If the clutch is not engaged, the LC counter value is left unchanged.

From either step 310 or step 314 the program advances to step 316 where the controller 40 checks whether the LC counter value has reached a predetermined value, in this case 40, for example. If yes, the program advances to step 318 and a "low charge" condition is indicated, preferably in the form of a LOW CHARGE warning light or other suitable indicator 320 to the operator.

The indicator 320 stays lit, for example, as long as the LC counter value equals or exceeds 40. From step 318 the program loops back to step 304. In this case, the controller 40 continues to monitor the low charge condition and could extinguish the light 320 if different load conditions render the low charge event less critical. If required, a limit value can be applied to the LC counter to limit the number of decrements needed to have the warning light or condition extinguished.

If the counter at step 316 has not reached the preset limit, the program returns to step 304. The controller 40 can be programmed to check the low charge condition at a rate as needed. For example, in the present embodiment, the controller 40 performs the operation of FIG. 6 about every second. Low charge is thus detected by the controller 40 by a process in which, when the valve 22 is fully open, a superheat condition of predetermined excess still exists over a selected time period.

Figure 7:
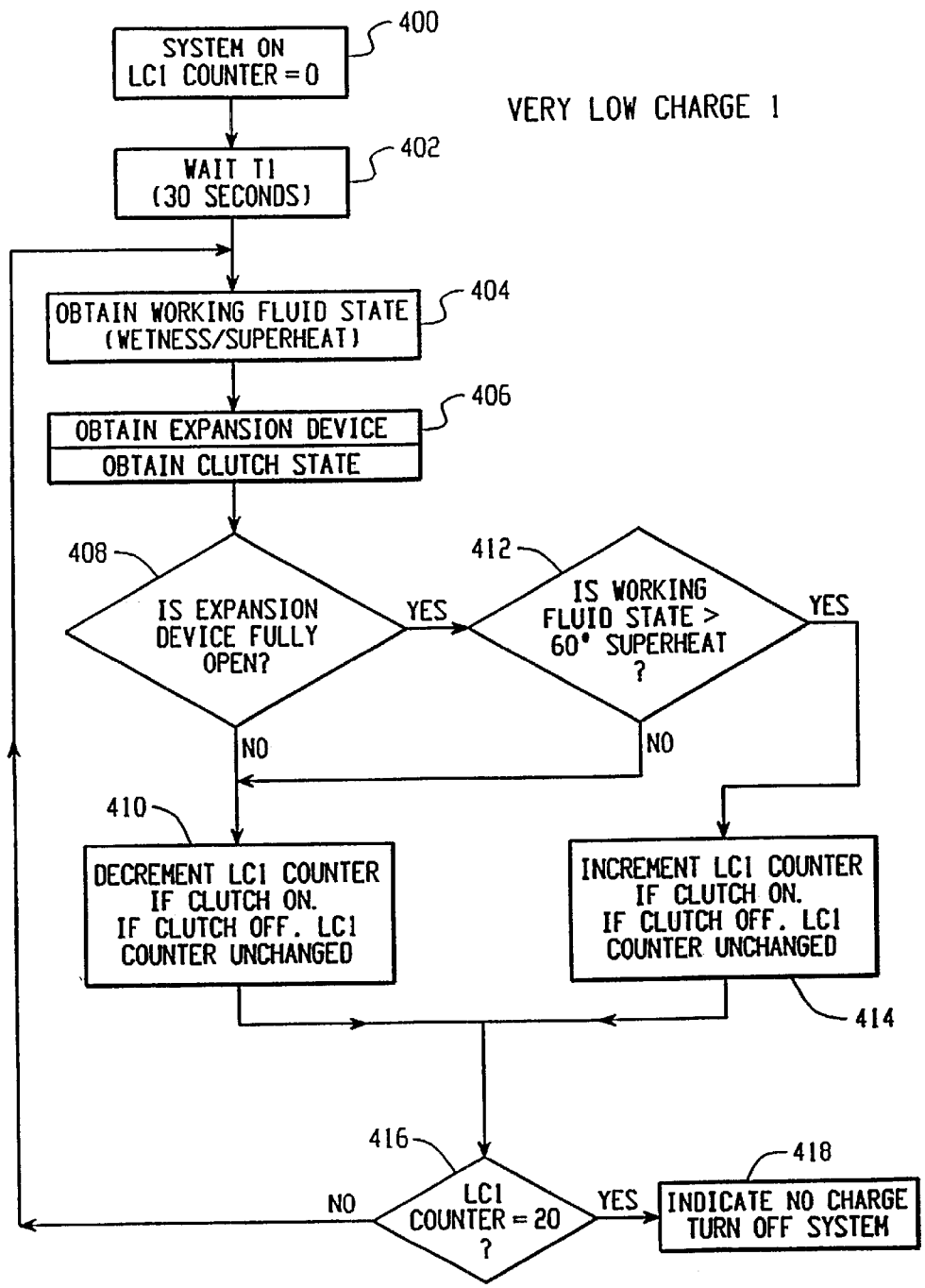
FIG. 7 is a flow diagram for a first very low charge detection technique in accordance with the invention.

Turning to FIG. 7, a suitable control algorithm for a first very low charge detection technique is provided. The process begins at step 400 with confirmation that the system 10 is on. A first very low charge (LC1) counter is initially set to zero. The controller 40 waits at step 402 for an initial time T1, in this case, thirty seconds, for example; and then at steps 404 and 406 acquires data from the valve 22 and the sensors 50, 150 and 250. In particular, the controller 40 at step 404 determines the working fluid state at the outlet side of the evaporator 14; and at step 406 determines the position of the valve 22 based on the commanded current 23 to the valve proportional solenoid. At this time the controller 40 can also check the compressor 16 clutch to detect if the clutch is engaged or not.

At step 408 the controller 40 determines whether the valve 22 is in the fully open condition. If the valve 22 is not fully open, the program advances to step 410, and the controller 40 decrements the LC1 counter by one count if the clutch is engaged. If the clutch is not engaged, the LC1 counter value is left unchanged.

If the valve 22 is fully open at step 408, the program advances to step 412. At step 412 the controller 40 checks whether the detected working fluid state at the evaporator 14 outlet side indicates a more severe predetermined superheat condition, in this case, 60 degrees superheat, for example. If the answer is no, the program advances to step 410. If the superheat condition is met, the program advances to step 414 and the LC1 counter is incremented by one count if the clutch is engaged. If the clutch is not engaged, the LC1 counter value is left unchanged.

From either step 410 or step 414 the program advances to step 416 where the controller 40 checks whether the LC1 counter value has reached a predetermined value, in this case 20, for example. If yes, the program advances to step 418 and a "very low charge" or "no charge" condition is indicated, preferably in the form of a NO CHARGE warning light or other suitable indicator 420 to the operator, and the system 10 is shut down or other suitable control is executed, such as disengaging the compressor 16 clutch. If the counter at step 416 has not reached the preset limit, the program returns to step 404. The controller 40 can be programmed to check the very low charge condition at a rate as needed. For example, in the present embodiment, the controller 40 performs the operation of FIG. 6 about every second. Very low charge is thus detected by the controller 40 by a process in which, when the valve 22 is fully open, an extreme superheat condition of predetermined excess exists over a selected time period.

As noted hereinabove, the improved operation of the low side sensor 150 based on the further use of the high side sensor 50 and the third sensor 250, permits the low charge and very low charge functions to be effective because the low side sensor 150 can detect a wider range of superheat conditions, for example over a range of 100 degrees superheat, especially under varying load and mass flow conditions. Note that the very low charge condition as detected in FIG. 7 is not permitted to persist as long as the low charge condition of FIG. 6. In this case, the very low charge condition produces a system shutdown in half the detection time (the low charge condition in this case does not produce a shut down command, although such could be done if required, or performed if the low charge condition persists.

Figure 8A:
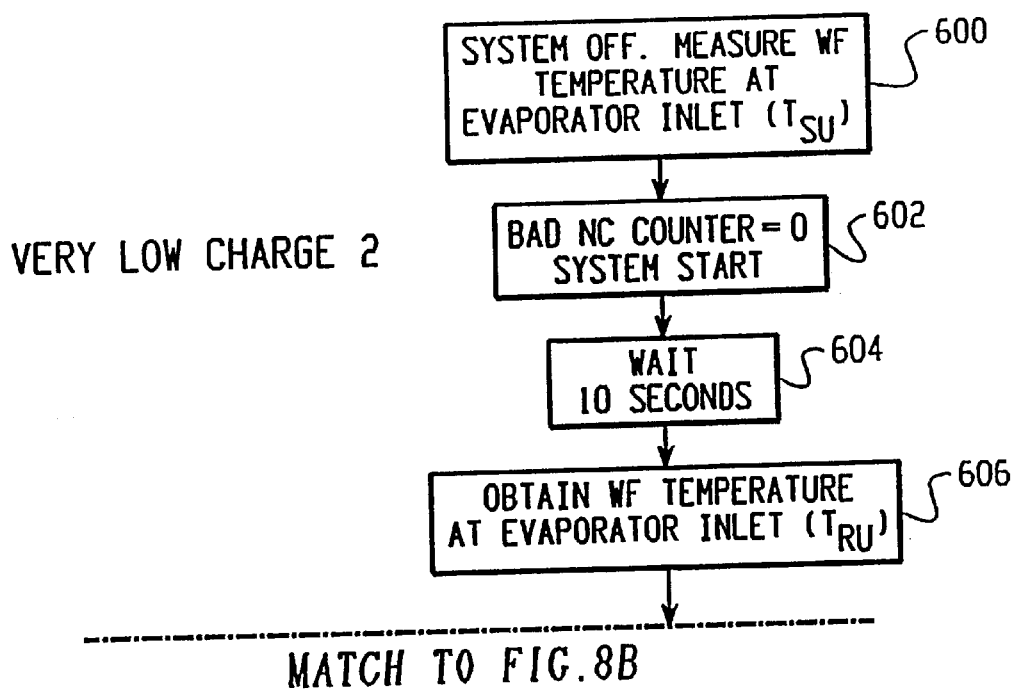
FIGS. 8A and 8B illustrate a technique during start-up for very low charge detection according to the invention.
Figure 8B:
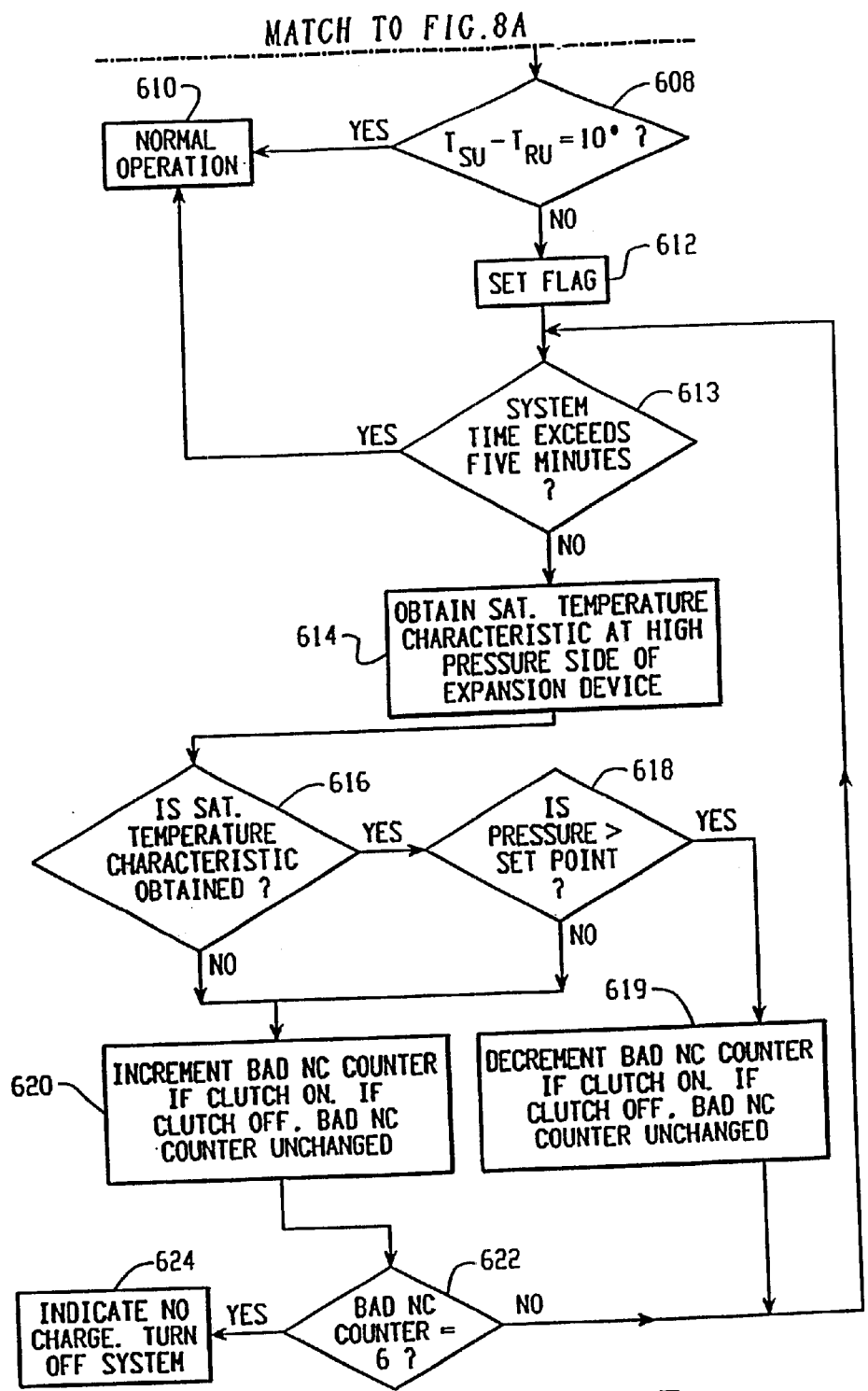

FIGS. 8A and 8B illustrate another control process for detecting a very low charge condition during start-up. In this technique, the process begins at step 600, at which time system power may be on but the working fluid 12 is not being pumped through the fluid circuit (referred to in FIG. 8A as system off, but not intended to imply lack of electrical power to the controller 40 and related circuits.

At step 600, the third sensor 250 is used to detect the temperature (Tsu) of the working fluid 12 at the inlet side of the evaporator 14. At step 602 a no charge counter (BAD NC) is set to zero value and the system 10 is started (for example, by engaging the compressor 16 clutch)such that working fluid 12 flows through the expansion device 22. At step 604 the controller 40 waits for a short predetermined time, in this case ten seconds, and then at step 606 acquires the third sensor 250 temperature reading (Tru). This reading at step 606 represents the working fluid 12 temperature at the inlet to the evaporator 14 shortly after starting fluid flow through the expansion device 22.

At step 608 the controller 40 calculates the change in temperature at the evaporator 14 inlet, or Tsu-Tru. In a normal fully charged system 10, the temperature at the evaporator 14 inlet side should drop rather quickly within the first ten seconds of system operation. In this embodiment, the controller 40 checks for at least a ten degree change in the evaporator inlet temperature. If the temperature change Tsu-Tru meets or exceeds this threshold, then the system branches to step 610 for normal operation according to the system operating set points, load demands and so on.

However, if the evaporator 14 inlet temperature change does not meet the minimum requirement, the program advances to step 612 and a data flag is set. At step 613 the controller 40 checks whether the system has been operating for more than a preselected time, in this example, about five minutes. If so, the program branches to 610 for normal operation, effectively disabling the very low charge detection start-up algorithm of FIGS. 8A,B. If the system has not yet been operating for the selected time at step 613, then the program advances to step 614.

At step 614 the controller 40 attempts to obtain a saturation temperature related characteristic of the working fluid 12 on the high pressure side of the expansion device 22. In the described embodiment, this step involves the use of the High Side sensor 50 as described hereinabove. The controller 40 applies a time varying current to the sensor and attempts to locate a local relative minimum thermal conductance or resistance and checks for the condition at step. This local minimum closely correlates to the saturation temperature of the working fluid 12. If the saturation temperature characteristic can be located, then the controller 40 detects that working fluid is present at the sensor 50.

Therefore, if the result at step 616 is YES, the program advances to step 618. In the present embodiment, the High Side sensor 50 is used to detect a characteristic that corresponds to the saturation temperature and hence pressure of the working fluid on the inlet side of the expansion device 22. At step 618 the controller 40 checks the pressure value obtained from the High Side sensor 50 data. If the pressure exceeds a preselected threshold or set point, the system 10 is deemed to have sufficient working fluid 12, and at step 619 the BAD NC counter is decremented if the compressor clutch is engaged, and the counter value is left unchanged if the clutch is not engaged. From step 619 the program returns to step 613.

If either the saturation temperature characteristic could not be found (e.g. no local minimum thermal conductance at the sensor 50—step 616) or if the corresponding pressure does not meet the set point at step 618, the program advances to step 620 and the BAD NC counter is incremented. At step 622 the controller 40 checks the value of the BAD NC counter and if it exceeds a preselected value, in this case six, the program advances to step 624 where the NO CHARGE indicator 420 is activated and the system 10 is shut down, the compressor clutch is disengaged, or some other suitable system control is exercised. If the result at step 622 is NO, the program returns to step 614. The controller 40 can be programmed to check the High Side sensor 50 at any suitable interval, such as every three seconds or so, for example.

As noted above, in the embodiment herein, the routine illustrated in FIGS. 8A,B is a start-up routine for the system 10 to detect a severe loss of fluid during initial system operation. After a selected time period, for example about five minutes, the start-up routine is disabled, since it has verified that at least initially the system 10 had enough working fluid. The low charge routine of FIG. 6 and very low charge routine of FIG. 7 can then be used throughout normal operation to detect a subsequent loss of working fluid.

While the control circuit 40 has been described with respect to a specific embodiment thereof, the functions of the circuit can be realized in many different embodiments. For example, typical component valves have been provided in FIG. 2, but these are merely exemplary. The graphs of the various figures also are intended to represent typical relationships that could be found in a representative system. Furthermore, those skilled in the art will appreciate that various set point values and other predetermined parameters (e.g. superheat values and time durations) identified herein are exemplary in nature and will be determined for each application.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. Apparatus for detecting low charge of a working fluid in a heat transfer system of the type having a fluid circuit comprising a compressor for pressurizing working fluid received from an evaporator, a condenser for cooling the working fluid received from the compressor, and an expansion device for controlling flow of the working fluid between the condenser and the evaporator, the apparatus comprising: a working fluid state sensor operative in response to a control signal and disposed in the fluid circuit on the outlet side of the evaporator to produce a working fluid state signal; and control means for providing said control signal to the sensor and for controlling operation of the heat transfer system based on a comparison of said working fluid state signal with a state set point; said control means detecting a low charge condition of the working fluid when the state signal indicates the working fluid, in a superheat condition, exceeds a first predetermined threshold over a first predetermined time with the expansion device in a fully open condition.

2. The apparatus of claim 1, wherein said state sensor comprises a first thermistor that is continuously self-heated in response to said control signal, said state signal being related to wetness/superheat of the working fluid.

3. The apparatus of claim 2, wherein said control means comprises a second thermistor disposed in the working fluid on the inlet side of the evaporator; said second thermistor producing an output related to a pressure dependent characteristic of the working fluid; said control means determining the working fluid state based on a ratio of said state signal and said second thermistor output.

4. The apparatus of claim 1, wherein the control means waits, for an initial delay period after the heat transfer system is turned on, before a low charge condition indication is deemed valid by the control means.

5. The apparatus of claim 1, wherein said expansion device comprises an electrically controlled expansion valve; the control means controlling mass flow of the working fluid to the evaporator by controlling the open and closed conditions of the expansion valve in response to said comparison of the detected working fluid state and the state set point.

6. The apparatus of claim 1, wherein the control means detects a very low charge condition of the working fluid when the state signal indicates the working fluid superheat exceeds a second predetermined threshold over a second predetermined time with the expansion device in a fully open condition.

7. The apparatus of claim 6, wherein said second predetermined threshold corresponds to a substantially higher superheat state compared to said first predetermined threshold.

8. The apparatus of claim 7, wherein said second predetermined time is substantially shorter compared to said first predetermined time.

9. The apparatus of claim 1 comprising a second sensor disposed in the working fluid on the inlet side of the evaporator; said second sensor producing an output related to temperature of the working fluid; and a third sensor disposed in the working fluid on a high pressure side of the expansion device.

10. The apparatus of claim 9, wherein the control means detects a very low charge condition of the working fluid by:
   a) monitoring the second sensor output before system start and after a second predetermined time following system start;
   b) setting a flag if the second sensor output indicates an insufficient temperature decrease after said second predetermined time;
   c) providing a second control signal to the third sensor to detect a saturation temperature related characteristic of the working fluid; and
   d) detecting a very low charge condition when the saturation temperature related characteristic of the working fluid cannot be detected over a third predetermined time with said flag set.

11. The apparatus of claim 10, wherein said second predetermined time is substantially shorter than said first predetermined time.

12. The apparatus of claim 10, wherein said very low charge condition function is disabled after said third predetermined time expires; said third predetermined time being substantially longer compared to said first and second predetermined times.

13. The apparatus of claim 9, wherein said second sensor is a non self-heated thermistor, and said third sensor is a self-heated thermistor that is gradually self-heated with a time varying current; said control means compensating said state sensor output for load changes using said second sensor output based on a ratio of the state sensor output and second sensor output, and compensating said ratio calculation for pressure changes across the evaporator using the third sensor output.

14. The apparatus as in claim 1, and further including a condenser fan for cooling the working fluid received from the compressor.

15. Method for detecting low charge condition of a working fluid in a heat transfer system of the type having a fluid circuit comprising a compressor for pressurizing a working fluid received from an evaporator, a condenser for cooling the working fluid received from the compressor, and an expansion device for controlling flow of the working fluid between the condenser and the evaporator, the method comprising the steps of:
   a) detecting superheat state of the working fluid on the outlet side of the evaporator over a first predetermined time whenever the expansion device is fully open; and
   b) detecting low charge condition of the working fluid when the working fluid superheat exceeds a first predetermined threshold over the first predetermined time with the expansion device in a fully open condition.

16. The method of claim 15, wherein the step of detecting superheat state includes the step of applying a constant current to a thermistor disposed in the working fluid to self-heat the thermistor so that the thermistor temperature is related to the wetness/superheat state of the working fluid.

17. The method of claim 16, wherein the step of detecting superheat state includes the step of detecting a pressure dependent characteristic of the working fluid at the inlet side of the evaporator and compensating the self-heated thermistor temperature value with said detected pressure dependent characteristic.

18. The method of claim 15 comprising the step of:
   c) waiting an initial delay period after the heat transfer system is turned on before a low charge indication is deemed valid.

19. The method of claim 15 comprising the step of:
   c) detecting very low charge condition of the working fluid when the working fluid superheat exceeds a second predetermined threshold over a second predetermined time with the expansion device in a fully open condition; said second superheat threshold being substantially higher compared to said first superheat threshold and said second predetermined time being substantially shorter compared to said first predetermined time.

20. The method of claim 15 including the steps of:
   c) detecting change in temperature of the working fluid at the inlet to the evaporator from a time just prior to system start to a second predetermined time after system start;
   d) detecting a characteristic related to saturation temperature of the working fluid on a high pressure side of the expansion device; and
   e) indicating a very low charge when the saturation temperature characteristic cannot be detected or the pressure is less than a pressure set point during a third predetermined time when the detected change in temperature at the evaporator inlet is less than a predetermined value.

21. The method of claim 15, wherein a condensor fan also cools the working fluid received from the compressor.

22. The method of claim 15, wherein the step of detecting superheat state includes the step of self-heating a thermistor disposed in the working fluid so that the thermistor temperature is related to the wetness/superheat state of the working fluid.

23. Apparatus for detecting very low charge of a working fluid in a heat transfer system of the type having a fluid circuit comprising a compressor for pressurizing working fluid received from an evaporator, a condenser for cooling the working fluid received from the compressor, and an expansion device for controlling flow of the working fluid between the condenser and the evaporator, the apparatus comprising: a working fluid state sensor operative in response to a control signal and disposed in the fluid circuit on the outlet side of the evaporator to produce a working fluid state signal; a second sensor disposed in the working fluid on the inlet side of the evaporator; said second sensor producing a signal related to temperature of the working fluid; a third sensor disposed in the working fluid on a high pressure side of the expansion device; and control means for providing said control signal to the state sensor and for controlling operation of the heat transfer system based on a comparison of said working fluid state signal with a predetermined state set point; said control means detecting a very low charge condition of the working fluid by:
   a) monitoring the second sensor signal before system start and after an initial predetermined time following system start;
   b) setting a flag when the second sensor signal indicates an insufficient temperature decrease after said initial predetermined time;
   c) controlling the third sensor to detect a saturation temperature characteristic of the working fluid; and
   d) detecting a very low charge condition when the saturation temperature related characteristic of the working fluid at the third sensor cannot be detected or the pressure is below a pressure set point over a second predetermined time with said flag set.

24. The apparatus of claim 23, wherein the state sensor comprises a continuously self-heated thermistor; said second sensor comprises a non self-heated thermistor; and said third sensor comprises a second self-heated thermistor that self-heats in response to a time varying current applied thereto in response to control signals from said control means.

25. The apparatus as in claim 23, and further including a condensor fan for cooling the working fluid received from the compressor.

* * * * *